UNITED STATES PATENT OFFICE.

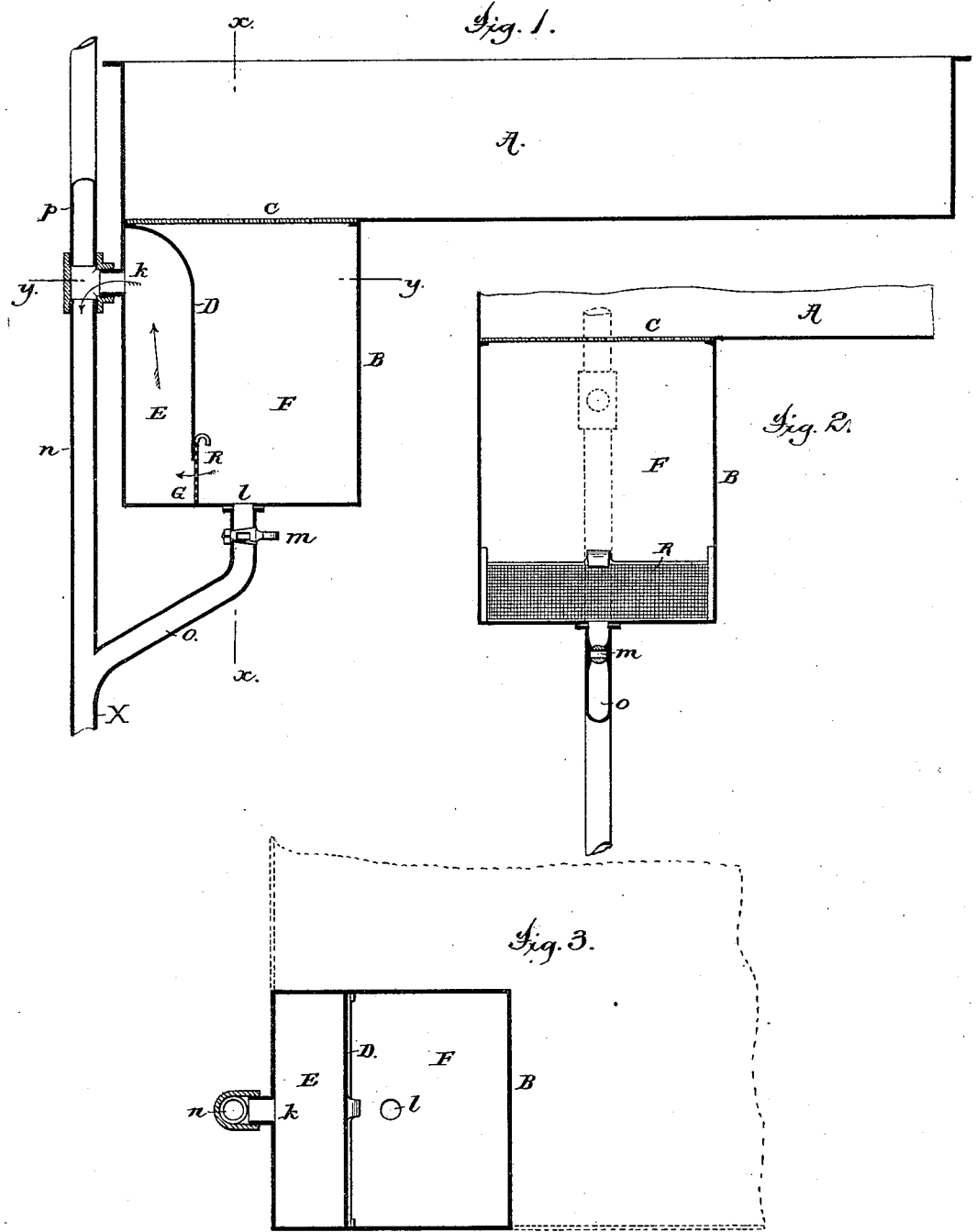

WILLIAM MORAN, OF WILLIAMSBURG, NEW YORK.

GAS-TRAP FOR SINKS, URINALS, &c.

SPECIFICATION forming part of Letters Patent No. 270,602, dated January 16, 1883.

Application filed November 5, 1880. (No model.)

*To all whom it may concern:*

Be it known that I, WILLIAM MORAN, a citizen of the United States, residing in the city of Williamsburg, county of Kings, and State of New York, have invented certain new and useful Improvements in Gas-Traps for Sinks, Urinals, and the like, fully described and represented in the following specification and the accompanying drawings, forming a part of the same.

In said drawings, Figure 1 is a longitudinal vertical section through an ordinary sink to which my invention is attached. Fig. 2 is a cross-section on the line $xx$ of Fig. 1, and Fig. 3 is a horizontal section on the line $yy$ of Fig. 1.

My invention relates to improvements in traps or water-seals adapted to be attached to sinks and the like; and it has for one of its objects the effective prevention of the flow or passage of foul matter or gases into the room containing the sink. It also provides for the accumulation of all solid substances that may pass through the small outlet-orifices of the sink, thus preventing the choking up of the trap or its outlet-pipe, and, also, for the thorough cleansing of the same of such solid substances and stagnant water.

My invention consists in a structure of trap or seal that provides for the passage of the water or other refuse desired to be conveyed from the sink to a sewer or other receptacle; of means for preventing the entrance into the eduction-pipe of solid contents that would choke the same; of means for suspending a body of water between the conductor-pipe and the sink to prevent the passage of foul gases into the room, and of means for conveying such gases as they flow rearward to the external air, all of which will be more particularly hereinafter pointed out by the aid of the accompanying drawings, which illustrate one embodiment of my invention.

In said drawings, A represents a sink or reservoir, into which slops, wash or other waste water, and the like, are emptied for the purpose of being conducted to a drain or sewer. Secured to the bottom of said sink or reservoir, and depending therefrom, is a box, B, opening into the same, and which may be of any desired shape and depth, though here illustrated as rectangular in shape. This box B is provided at its mouth, by which it communicates with the sink A, with a perforated lid or cover, C, which will allow the passage of water into the said box, while operating to prevent solid substances from entering the same. This box B is constituted a trap, as follows: It is divided into two chambers, E F, of unequal cubical area, by means of a partition, D, that is connected with the walls of the said box and closed over the top of the smallest chamber E, but made short enough at its lower end to provide an opening, G, connecting the chambers E F at the bottom of the box B for a purpose yet to be described. The chamber E of the trap is provided at or near its upper or closed end with an outlet-orifice, K, connecting with an eduction-pipe, $n$, which joins a conductor, X, leading to a drain, sewer, or cesspool. The chamber F of the trap, into which the water from the sink first enters, is also provided, preferably at its bottom, with an outlet-orifice, $l$, that is connected by a pipe, $o$, with the conductor X, the former pipe being provided with a valve or cock, $m$, to control the flow of material through it.

My improvement, as thus far described, operates as follows: Waste or other water, being emptied into the sink A, passes through the perforated plate C into the receiving-chamber F of the trap B, and through the opening G into the chamber E. The water flowing into said receiving-chamber F will rise in it and the chamber E until the level of the opening K is reached, when the excess will flow into the discharge-pipe $n$, and thence through the conductor X to the drain.

To effectually prevent the choking up of the opening G and the chamber E by any solid substance that may escape the perforated plate C, and to accumulate the same in the receiving-chamber F, I have placed a wire screen or vertical plate, R, over said opening G, which plate, as illustrated, is capable of sliding in grooves formed by projections from either wall of the trap B, and of being removed, if desired, when cleansing the same.

The trap or box B is cleansed of the solid substances that may accumulate in it, and of foul fluid contents, when desired, by means of the outlet $l$ and its pipe $o$, that is closed and controlled by the valve or cock $m$, which latter is closed during the use of the sink, and opened to permit the passage of solids and water during the cleansing of said trap.

From the mode of operation already described it will be observed that there is constantly maintained in the trap or box B a body of fluid that is interposed between the discharged matters, or the drain or sewer containing or conducting them, and the sink or room containing the same, which body of fluid operates as a seal or trap, preventing foul odors passing into such room. As is well known to plumbers, such gases are often forced toward the trap with a power sufficient to cause them to pass through this water-seal. To prevent this disastrous occurrence I have provided an exit for the gases that thus accumulate by means of a pipe or conductor, p, arranged to lead from the pipe n, at or about its point of connection with the chamber E, which pipe may lead to the top of the dwelling or house, or otherwise convey the foul gases rising in the pipe n to the outside atmosphere. This arrangement will, as is at once apparent, afford a direct conduit for the gases that may rise in the pipe n, and thus carry them off by a direct conductor that effectually prevents their accumulating force by reason of confinement, whereby a power sufficient to penetrate the water-seal might be attained and such objectionable gases caused to enter the room. This pipe p also acts to destroy the siphon character of the passages E F, and thereby acts to maintain the water-seal.

It is obvious that although this trap has been described as connected to a sink, it can without difficulty be arranged with any vessel where it is desirable to provide such a trap.

What I claim is—

1. The combination, with a sink or its described equivalent, of the trap or box B, divided by a vertical partition into chambers E F, the former of which is air-tight at its upper end, and provided with discharge-orifices K l, screen R, and foul-gas conductor p, substantially as described.

2. The combination, with the trap or box B, divided into chambers E F, the former of which is air-tight at its upper end, and provided with discharge-orifices K l, of the movable screen R, substantially as described.

In testimony whereof I have hereunto set my hand in the presence of two subscribing witnesses.

WILLIAM MORAN.

Witnesses:
T. H. PALMER,
GEO. H. GRAHAM.